C. De Saxe.
Parasol.

Nº 22943. Patented Feb 15. 1859.

Witnesses

Inventor
Charles De Saxe

UNITED STATES PATENT OFFICE.

CHARLES DE SAXE, OF NEW YORK, N. Y.

UMBRELLA-FASTENING.

Specification of Letters Patent No. 22,943, dated February 15, 1859.

*To all whom it may concern:*

Be it known that I, CHARLES DE SAXE, of the city and State of New York, have invented a new and useful Method or Mechanical Arrangement for Connecting and Fastening Parasol and other Jointed Rods; and I do hereby declare that the following is a full, clear, and exact description thereof and of its manner of operation, reference being had to the accompanying drawings and to the letters of reference marked thereon.

Figure 1:
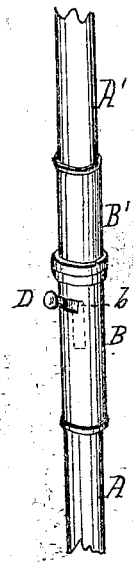
Figure 2:
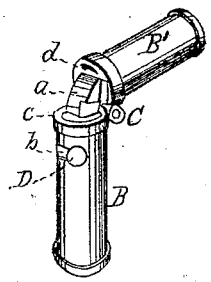
Figure 3:
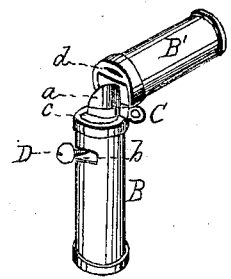

Figure 1 is a view of a rod as extended and the bolt fastened. Fig. 2 is a view of the rod, partly closed or shut on its hinge, and showing the position of the bolt, when not fastened or locked. Fig. 3 shows the position given to the bolt, when turned or revolved, so as to be locked and fastened.

My invention consists in such an arrangement of parts that the two parts of the rod may be easily extended or shut together, and such that when extended they may be firmly and quickly fastened together; and consists in having a tube or socket attached to the ends of the two parts of the rod, and which tubes or sockets are hinged together by a solid or fixed joint or hinge, one of such tubes having a sliding or revolving bolt, which works into the other tube, and thus holds the two parts of the rod firmly in line with each other.

To enable others skilled in the art to understand my invention I will proceed to describe its construction and manner of operation.

A, A, represent the two parts of a parasol handle or jointed rod, having the tubes or sockets B, B', attached to them, which are firmly fixed to the rods A, A' and extend a little beyond such rods, so as to allow of the motion of the bolt hereafter described. The sockets or tubes are connected together by means of a fixed joint C, as seen in the drawings, instead of by a hinge, or part, jointed separately to each tube, as is usually the arrangement in parasol and other similar jointed rods. Within one of these tubes or sockets B, is a movable bolt $a$, which is operated or rotated by means of the knob D, projecting through the tube and moving in the slot $b$. The upper end of this bolt $a$, or that part which is intended to enter the other tube B' may be shaped as seen in Figs. 2 and 3, like to the latch bolt of ordinary locks, that is tapering or beveled in one side, and on one side of such bolt, at right angles, or nearly so, with such beveled surface is a groove $c$, for the purpose hereafter specified.

In the mouth of the upper socket or tube B', and nearest one side of such tube is a bar $d$, of a thickness equal to the width of the groove $c$, and the bolt $a$, is reduced in size or thickness so as only to fill the space between the bar $b$, and the opposite side of the tube B'.

When the rod is to be extended, the bolt $a$ is placed as shown in Fig. 2, and it then readily enters into the tube B, as the rod A' is brought into line with the rod A; when the rod is so extended, a partial revolution or rotation of the bolt $a$, by turning the knob D, causes the grooves $c$, to embrace or lock upon the bar $d$, and thus quickly and firmly fastens the two parts of the rod together. The position of the bolt, when so locked, is seen in Fig. 3. A contrary movement of the knob D, instantly disconnects the groove $c$, from the bar $d$, and allows the two parts of the rod to be closed or shut together upon the hinge C.

As will be apparent the two parts of the rod are fastened or unfastened by simply turning or rotating the bolt $a$, by means of the knob D, and while the bolt remains as shown at Figs. 1, and 3, the rod is firm and stiff. When the bolt is rotated, or placed as shown in Fig. 2, the weight of the rod causes it at once to shut together. Instead however of giving the bolt the shape above described, it may be left of the full size of the tube B, and may be raised by the knob D, up into the tube B' and then rotated so that the knob D, will pass into the side slot, and thus prevent the bolt from dropping back. In such case the slot will be extended down, as shown by the dotted lines in Fig. 1, so as to allow the bolt to pass from out of the tube B', when the knob D, is turned back and the rod is to be closed.

I am aware that catch bolts, operated by means of springs and having knobs or projections to depress them, have been used to support and fasten hinged or jointed rods, such rods being also connected by tubular hinged joints, and therefore I do not claim generally the use of bolts to fasten such rods, or the use of a tubular hinged joint to connect them, but

What I claim as my invention and desire to secure by Letters Patent, is—

The arrangement of the bolt $a$, substantially as described, operating without springs and by a double, or sliding and rotating motion, in combination with the tubes or sockets B, B, for the purposes set forth.

CHARLES DE SAXE.

Witnesses:
S. D. LAW,
E. F BARNES